March 5, 1946.   A. E. KROWS   2,395,883
MEANS FOR PROJECTING IMAGES FROM INTERMITTENTLY ADVANCING FILM STRIPS
Filed Feb. 25, 1944   3 Sheets-Sheet 1
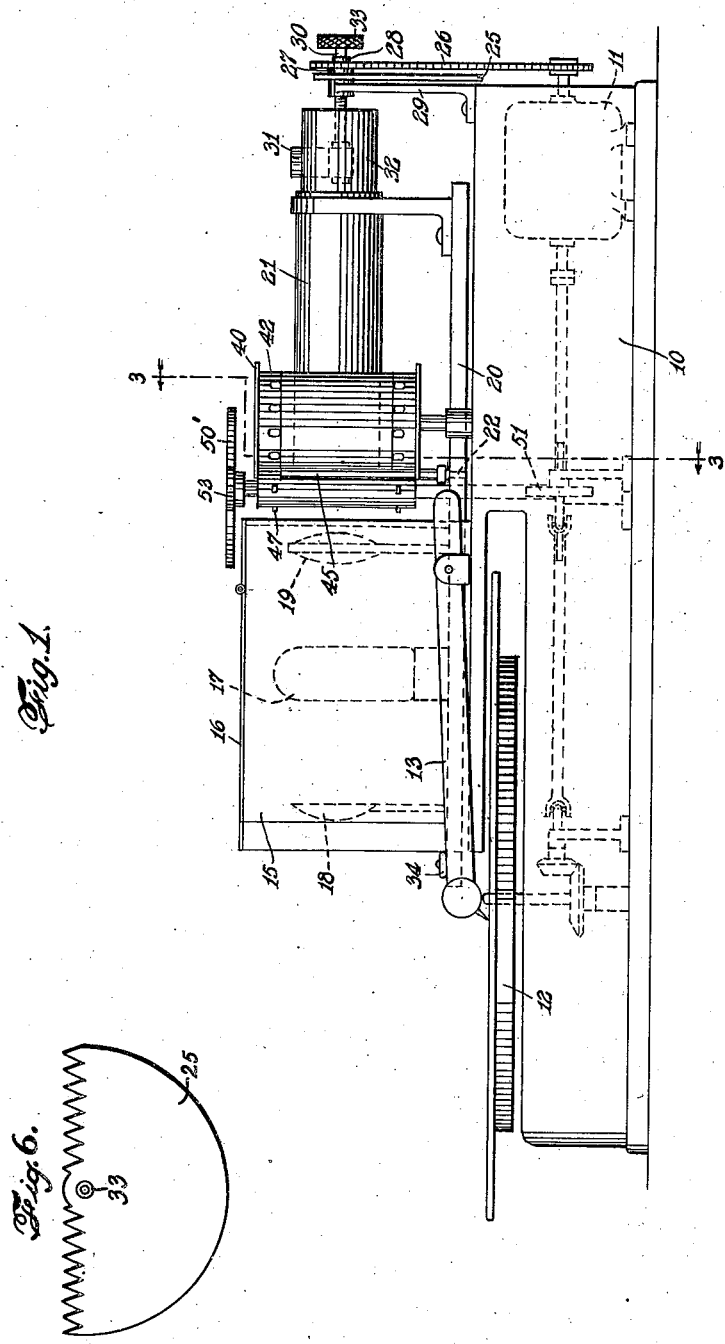
INVENTOR.
ARTHUR E. KROWS
BY
ATTORNEY.

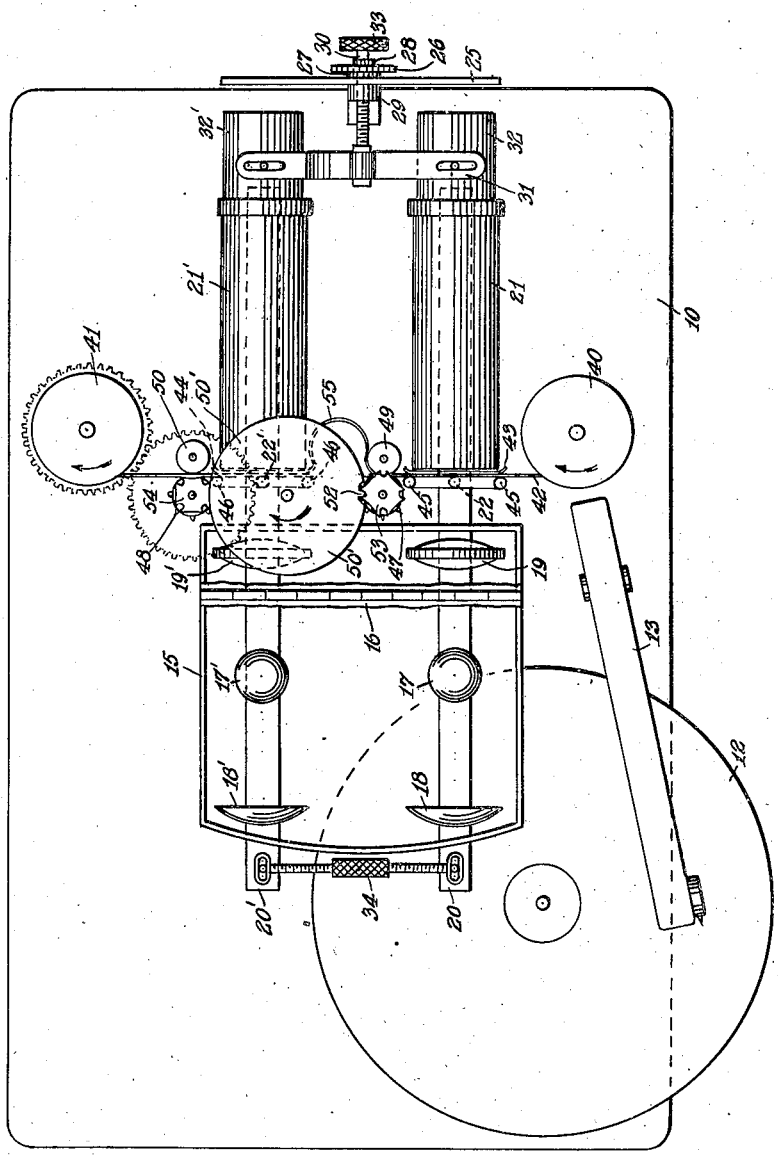

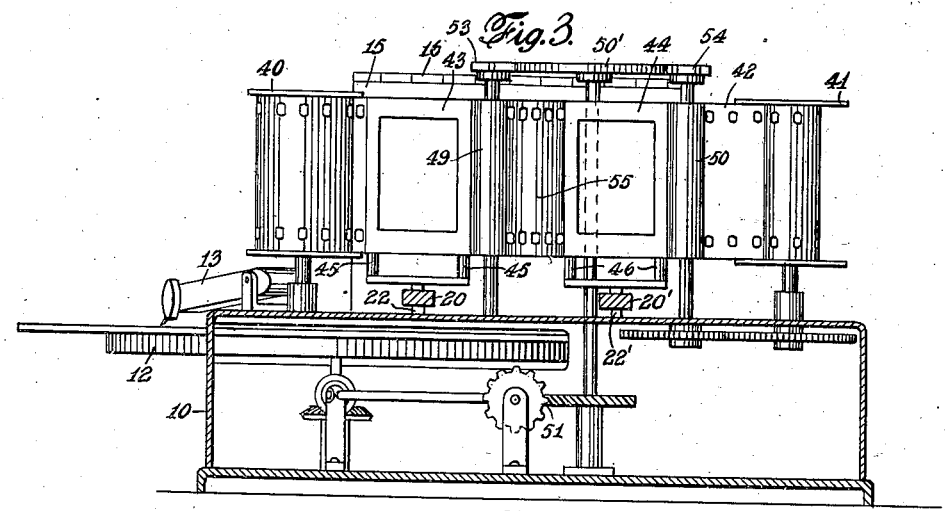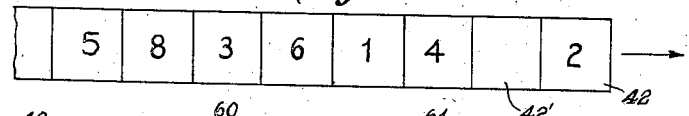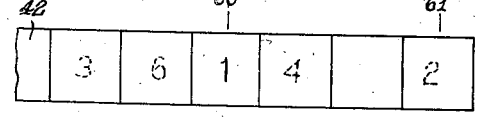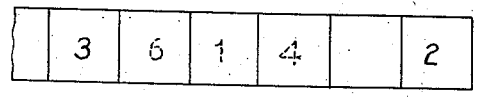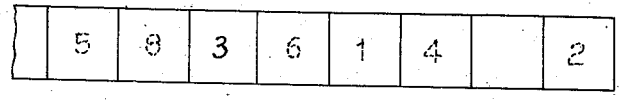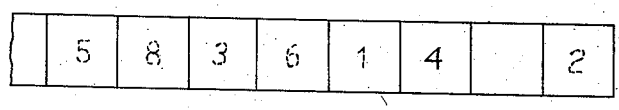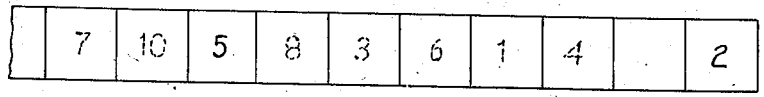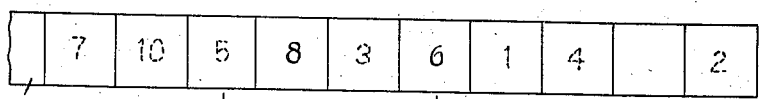

Patented Mar. 5, 1946

2,395,883

UNITED STATES PATENT OFFICE 2,395,883

MEANS FOR PROJECTING IMAGES FROM INTERMITTENTLY ADVANCING FILM STRIPS

Arthur E. Krows, Hastings on Hudson, N. Y.

Application February 25, 1944, Serial No. 523,822

1 Claim. (Cl. 88—28)

The invention relates to stereopticon devices of the nature wherein there is utilized a continuous strip of film having successive frames depicting the matter to be exhibited, the film being successively advanced with respect to an optical system by which an image of the matter depicted on a frame is projected upon a suitable screen.

Heretofore, no attempt has been made in the intermittent projection of the pictures on successive frames to obviate, other than by "blurring" the same or by shutting off the light completely, the distracting effect caused by the advancing movement of the film which, of course, would appear on the screen. It has been customary, also, to introduce frames bearing titles and explanatory material among the various pictures of the frames; and occasionally there is combined with such projector or stereopticon musical accompaniment and/or narration, the same being supplied by the usual sound-reproducing mechanism. It has been found difficult to synchronize such matter with the projection of the images, and various expedients have been proposed to this end such as the injection into the pre-recorded sound of audible signals, sounds of bells, clicks and the like, said signals serving to notify the manual operator of the picture when to change.

It is an object of the present invention to provide a novel method of projection and mechanism which will avoid the objectionable and irrelevant motion effects on the screen during a change from one picture to another, as projected from an intermittently advancing film strip through a duplex optical projection system; also, to provide projection mechanism which will lend itself readily to a practical or approximate synchronization of sound with the picture showing.

Another object of the invention is to provide a duplex optical system for the projection of the pictures whereby pictures on the same film strip are alternately projected upon a common field of the screen, the projection from one system being intercepted during the active period of the other.

Still another object of the invention is to so mount the two optical systems that an adjustment of the same is possible for registering projected matter from each system upon a common field of the screen.

A further object of the invention is to provide a novel film strip advancing mechanism, including intermittently actuated feed and take-up sprockets.

A still further object of the invention is to provide a novel arrangement on the film strip of the subject matter to be projected, as represented by the successive frames thereon.

In carrying out the invention, there is provided, instead of the usual single optical system for projecting an image upon the screen, a pair of optical systems having associated therewith suitable dissolving means or other means for intercepting temporarily the projected image from one of the systems while an image is projected by the other, projection of images being effected alternately from the two systems. Provision is made for advancing in a novel manner a film strip with respect to the corresponding lenses of these optical systems such that a plurality of frames is fed past a system during the projection interval of a second optical system, whereupon the projected image from the latter is intercepted and the image projected by the former system is viewed on a screen. During this period of projection by the said former optical system, the film originally fed, and which has bulged or looped itself between the two systems, is taken up or drawn to position a frame for juxtaposition to the second optical system, and the cycle is repeated.

It will be appreciated, also, that the sequence of the frames on the film strip cannot follow the consecutive arrangement, as is the usual practice, and a novel grouping is set forth, involving a displacement along the film, for example, of one frame between, say, even-numbered displays, the progression order decreasing in the direction of film travel by 2 for such even-numbered displayed frames and similarly in the case of the intermediate odd-numbered displayed frames. Or, in other words, frames designed for consecutive projection are displaced from each other along the strip by the width of a like number of frames in excess of one and preferably two frames.

If a common driving mechanism is utilized to effect this film shifting and the operation of the sound-reproducing mechanism, such as a turntable element thereof, it will readily be appreciated that practical synchronization of the visual and acoustical effects may be had.

The nature of the invention, however, will best be understood when described in connection with the accompanying drawings, in which:

Fig. 1 is a side elevation of the novel projection mechanism having associated therewith also sound-reproducing mechanism.

Fig. 2 is a plan thereof with portions broken away.

Fig. 3 is a transverse vertical section, with lenses removed, taken on the line 3—3, Fig. 1 of the drawings, and looking in the direction of the arrows.

Fig. 4 illustrates the novel arrangement of frames upon a section of film strip.

Fig. 5 is a diagrammatic view illustrating successive positions of the film strip frames with reference to the two optical systems during the consecutive projection of six frames thereof.

Fig. 6 is a front elevation of a shutter member suitable for use in the projection mechanism.

Referring to the drawings, 10 designates a suitable casing or cabinet in which is mounted an electric motor 11 for operating the projection mechanism through intermediate gearing, as hereinafter set forth. The casing 10 retains also sound-reproducing mechanism indicated by the turntable portion 12 and the pick-up or sound reproducer arm 13 thereof. The latter is pivotally mounted on the top of the casing, while the former extends beyond the rear and to one side of said casing, as indicated.

At the rear, the casing 10 is extended upwardly to afford a lamp housing 15, preferably closed normally by a hinged cover such as lid 16, there being mounted in said housing two sets of light-projector means including lamps 17 and 17', with reflectors 18 and 18', respectively, and corresponding condenser lenses 19 and 19'. Of course, a single lamp may serve, having its light rays directed through a prism to both of the reflectors. The two sets of light-projector means are carried respectively by two longitudinally extending bars 20 and 20' which carry also the projection lenses 21 and 21' for the respective light-projector means, the whole constituting two separate and independent optical systems. All of these elements are rigidly mounted upon the said bars 20 and 20' but the latter are fulcrumed on the top of casing 10 as on respective supports 22 and 22' to swing about an axis substantially in the plane of the film carrying the matter to be projected.

Provision is made, also, for intercepting an image projected by one of the optical systems during the period of projection of an image by the other. This may be effected by rotating a semi-circular shutter or dissolver disk 25 having a serrated diametral edge, the disk being driven from the motor 11, for example, through a chain and sprocket connection 26. This drives a sleeve 27 of said disk mounted for rotation on a tubular hub 28 secured to a standard 29 extending upwardly from the top of the casing 10. A focusing spindle 30 is threaded through the hub 28 and extends freely through the standard 29 to a crossbar 31 connecting through slotted arcuate end connections the two movable barrel portions 32, 32' of the lenses 21 and 21', a suitable knurled head 33 being provided at the outer end of spindle 30 to effect the focusing operation by telescoping said barrel portions 32, 32', as is well understood.

The pivotal mounting arrangement hereinbefore described with respect to the duplex optical systems is for the purpose of admitting of the adjustment simultaneously and in like degree of these two systems in registering projected matter from each system upon a common field of the screen in accordance with the distance of such screen from the said optical systems, by converging or diverging the respective images projected by the two lens systems. This adjustment may conveniently be effected by introducing a turnbuckle connection 34, operating on reverse threads, between the rearward ends of the bars 20 and 20' which swing on the supports 22, 22' therefor to spread the ends of these bars apart or to draw them together.

There is mounted upon opposite sides of the duplex optical systems on the top of casing 10 a pair of reels 40 and 41, the former being the feed or supply reel for a film strip 42 and the latter the take-up reel for film, the frames of which have been projected by the said optical systems. Said reels are to be equipped with the usual accessories (not shown) for accommodating the changing diameters of the film spools during operation. Such film may be of the standard 35 millimeter motion picture type, bearing successive frames, but, in accordance with the present invention, these frames are not located thereon in the usual sequence embodying a consecutive arrangement of the subject-matter, and involve a novel grouping and predetermined order of printing on the film which differs from their order of presentation on a screen, as will hereinafter be more fully set forth.

The said film 42 to this end is arranged to be drawn past the two optical systems, that is to say, between the condenser and projecting lenses thereof, as is customary in projection of pictures upon a screen, and in the embodiment shown transversely of the apparatus, although a vertical travel thereof would be required if the lens systems were located one above the other. The film strip is arranged to be guided over two suitably apertured gate members 43 and 44 which are located before the respective lenses 21 and 21' and movable therewith by the respective bars 20 and 20' on which they are carried. Pairs of idler guide rollers 45 and 46, similarly mounted, are provided at opposite sides of the respective guides to hold a frame of the film firmly against the guides and juxtaposed to the respective apertures thereof, and the first roller of the latter pair 46 to allow of the formation of an intermediate loop of the film strip, as will hereinafter be more fully set forth.

An advancing sprocket 47 is provided beyond the first pair of guide rollers 45 to feed film to the first gate 43 and a sprocket 48 is provided beyond the other gate 44 to draw film to said gate 44, suitable spring-urged rollers 49 and 50 cooperating with the respective sprockets 47 and 48 to maintain the film in threaded relation thereto, these spring rollers being swingable away from a corresponding sprocket for convenience in effecting the initial threading of the film through the mechanism, as is well understood.

The sprocket 47 and the sprocket 48 are arranged for alternate operation from a continuously rotating member 50' driven from motor 11 through intermediate transmission mechanism 51 to provide the proper timing which is coordinated with the speed of the turntable 12, so that an approximate synchronization of the matter projected from the film 42 and the sound produced through rotation of a record on said turntable may be secured. Sprocket 48, also, is geared to the take-up reel 41 to drive the same.

If the projection mechanism aforesaid is not to be associated with sound reproducing means, the necessity for continuous and steady operation thereof, to secure proper rotation of the turntable, is not present and said mechanism may be manually operated, if desired. Also, the duration of dissolve and rate of succession of the projections need not then be predetermined.

The said member 50' is in the nature of a cam or element of a Geneva movement having an operating portion 52 such as a tooth or group of teeth for alternative engagement with the star wheels 53 and 54, respectively fixed to the sprockets 47 and 48 whereby these may be periodically actuated to advance the film strip the required amount, which, in accordance with the present invention, is not the usual space of a single frame but that occupied by two frames in the embodiment shown. A loop 55 will accordingly be formed of the film between the two optical systems, this occurring during the period of projection through the second optical system represented by the lens 21'. Since the sprocket 47 is being rotated during this interval of projection interception in the case of lens 21, the effect of the moving film is not noticed on the screen. When projection is effected through lens 21, the loop 55 is taken up by the rotation of sprocket 48 drawing a new frame into juxtaposition to the lens 21' for subsequent projection thereof when the shutter again clears this lens. As the cycle continues, the film progresses two frames during each cycle which comprises two projections, but the projections of different frames are alternately effected from the two lenses 21 and 21'.

This, of course, does not admit of utilizing a film strip having the customary location of frames in succession along said strip for consecutive display in the normal order of succession, and requires a displacement of consecutively displayed frames along the strip, in the instant embodiment equal to the width of two frames. Reference being had to Fig. 4 of the drawings, the consecutive showings are indicated by the numbers 1, 2, 3, 4, 5, 6, etc., and it will be noted that the progression of even-numbered frames decreases in the direction of film travel by 2, and similarly with respect to the odd-numbered frames which are positioned intermediate the even-numbered frames, except in the initial instance where a blank frame 42' is necessary and follows the first frame, which is numbered 2. The frames with numbers shown in dotted lines, Fig. 5, indicate that the projection is temporarily intercepted. For example, in the case of the frame numbered 2, this frame is designed to be projected subsequently by the lens 21' (the optical axis of which is indicated at 61—61, Fig. 5) following projection of frame marked 1, displaced two frames from the frame marked 2 and in the optical axis indicated at 60—60, Fig. 5. By this expedient, a frame shown, for example, through the optical system having the lens 21 will never be juxtaposed to the lens 21' of the other optical system.

This will best be understood by reference to Fig. 5 of the drawings, wherein three successive positions of the film strip 42 with reference to the duplex optical system are indicated. In the first and initial position of the film strip 42, the image of frame 1 appears on the screen and the projection of frame 2 is temporarily obscured. Thereupon, and before the film is taken up by sprocket 48, the image of frame 2 will be displayed, during which time buckling or looping of the portion including frame 1 occurs, with frame 3 drawn into juxtaposition to the lens 21 by sprocket 47. During the display of this frame 3, sprocket 48 takes up the loop and draws thereby frame 4 into juxtaposition to the lens 21'. When this cycle is completed, the following cycle will provide for display similarly of the images of frame 5 and frame 6, and so on.

To thread the film strip into the projection apparatus, it is not necessary to provide initially the loop 55 between the two sprockets 47 and 48, so long as the star wheels 53 and 54 and cooperating cam 50' and the dissolver disk 25 are in proper relationship to one another, for the first picture, for example the one marked 1, Fig. 5, will be projected from the film in the optical axis 60, whereupon the loop will be formed automatically during the projection in the optical axis 61 of the picture marked 2. During this period, also, frame marked 3 has been brought into registry with the optical axis 60, for repetition of the cycle.

It will be possible to prolong with the novel mechanism the showing of a given picture beyond that which would ordinarily result from the projection of a single frame. This may readily be effected by projecting the same picture the desired number of times in the two different optical axes through corresponding association of the required frames, which will then all bear like matter to be projected.

The novel arrangement hereinbefore described, which makes possible the smooth dissolving of one picture into another while keeping the attention of an audience fixed, allows, also, through the projection of closely-related pictures in succession, of attaining a slow-motion effect in the projection. Thus, it might be made to show, for example, the opening of a flower bud to blossom, or a fading away of the external portions of a machine to disclose its interior. As another example a progressive showing could be had of changes in a map with projection simultaneously of explanatory arrows and captions that can be caused to appear and disappear variously as the accompanying narration requires.

Even in the normal presentation, the flow of pictures makes possible a continuity of effect not obtainable with existing types of slide-film projectors.

I claim:

In projection apparatus for projecting upon a common field of a screen a succession of images from a film strip: the combination with projection means including a pair of independent associated optical systems, a feed reel for the film and a take-up reel for the film; of sprocket means to withdraw intermittently from the feed reel a predetermined length of the film strip to advance it with respect to one of the optical systems and juxtapose a frame thereof to said one of the systems; a second sprocket means to advance the withdrawn portion of the film strip with respect to the other of the optical systems; a continuously rotating disk having a peripheral tooth adapted for engagement alternately with the two sprocket means to effect their respective advances; and a semi-circular shutter coordinated with the continuously rotating disk for intercepting an image projected from one of a number of successive frames as juxtaposed to one of the optical systems and during projection of an image from frames successively juxtaposed to the other system.

ARTHUR E. KROWS.